Figure 1:
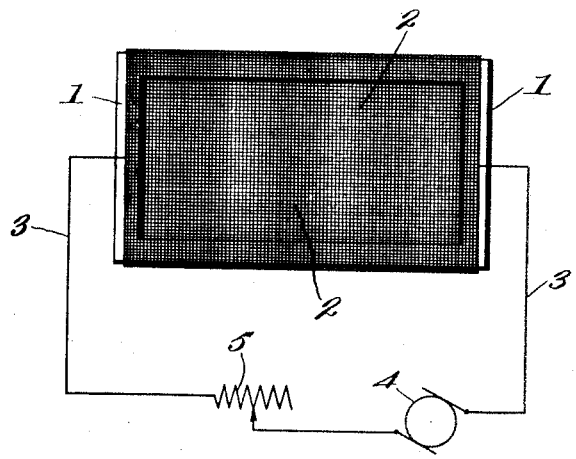

W. S. LANDIS.
CATALYZER FOR OXIDIZING AMMONIA.
APPLICATION FILED JAN. 27, 1916.

1,193,800.

Patented Aug. 8, 1916.

Inventor
Walter S. Landis, by
Attorney

UNITED STATES PATENT OFFICE.

WALTER S. LANDIS, OF NEW YORK, N. Y., ASSIGNOR TO FRANK S. WASHBURN, OF NASHVILLE, TENNESSEE.

CATALYZER FOR OXIDIZING AMMONIA.

1,193,800.　　Specification of Letters Patent.　　Patented Aug. 8, 1916.

Original application filed February 20, 1915, Serial No. 9,596. Divided and this application filed January 27, 1916. Serial No. 74,673.

*To all whom it may concern:*

Be it known that I, WALTER S. LANDIS, a citizen of the United States, residing at New York city, in the county of New York and State of New York, have invented certain new and useful Improvements in Catalyzers for Oxidizing Ammonia; and I do hereby declare the following to be a full, clear, and exact description of the invention, such as will enable others skilled in the art to which it appertains to make and use the same.

This invention relates to an apparatus for oxidizing ammonia and has for its object to produce nitrose gases in a manner more efficient and less costly than has been heretofore proposed.

With these and other objects in view the invention consists in the novel construction constituting my apparatus, all as will be more fully hereinafter disclosed and particularly pointed out in the claims.

In my copending application, Serial No. 9596 filed February 20, 1915, and entitled Process of and apparatus for oxidizing ammonia, of which this application is a division, I disclose and claim a method of oxidizing ammonia for which the apparatus made the subject of this application is suitable. Also in my copending application Serial No. 9595, filed February 20, 1915 and entitled Method of oxidizing ammonia I disclose certain reactions that are involved in the oxidation of ammonia to nitrose gases, and how the precooling of the gas mixture before striking the catalyzer gives rise to a much higher efficiency than is found in the older methods which do not employ this cooling action. But in the use of a cooler there is naturally brought forward prominently the necessity of providing special means for supplying the required amount of outside heat to the reacting mixture in order that the flame may burn continuously.

I have found that when one uses an ammonia air mixture in the proportion of one volume of ammonia to 15 volumes of air the resulting flame temperature is only about 460° C. and inasmuch as this combustion takes place best at temperatures of slightly above 700° C. I find with such proportions of air there is a deficiency in heat units of 2670 cals. per cubic meter of ammonia burned. Even in case one operates with a mixture of one volume of ammonia to ten volumes of air the resulting flame temperature is only 640° C. and there is a deficiency of 470 cals. per cubic meter of ammonia burned. On the other hand, similar calculations show that if a mixture of one volume of ammonia to 7½ volumes of air could be used the resulting flame temperature, allowing for slight losses, would be just about right for the proper working of the catalyzer. But again, when a mixture of ammonia and air containing less air than one volume of ammonia to ten volumes of air is used it does not operate well from a chemical standpoint; and, therefore, one always needs to supply, when operating with ammonia-air mixtures, a certain quantity of heat to the reaction, depending upon the ratio of ammonia to air. I therefore, have found that one must be prepared, in operating a catalyzer for this purpose, to supply a variable amount of heat, the quantity depending upon the ratio of ammonia to air which one desired to use. Of course, if one uses an enriched air, such as the waste gases from a liquid air plant, producing nitrogen, or if one employs purposely enriched gases made by introducing oxygen into air in any well known manner, this deficiency of heat will disappear with an increase of the oxygen content of the air used. It is however, necessary to meet a varying heat requirement in the reaction, even when operating with various kinds and proportions of enriched air.

It is under all circumstances necessary to supply heat in order to start the reaction going, and this can best be done by preheating the catalyzer until the flame ignites and burns steadily. I, therefore, see that in a commercial operation of an ammonia oxidation plant it is necessary to provide means, not only of heating the catalyzer, but of controlling the amount of heat one supplies to this apparatus.

I am well aware that the most advantageous system of supplying heat that must be accurately controlled, is through transforming electrical energy into heat by the interposition of a suitable resistance. And the ease with which this electrically generated heat can be controlled to an exactness which is so essential to this process makes it an added feature of the process.

I am also aware that many years ago laboratory experiments were carried out in which platinum spirals were heated in a current of an ammonia-air mixture, forming nitric acid. These experiments, however, were only of scientific interest because the yields were extremely low and a very large percentage of nitric acid which might have been formed was subsequently decomposed by remaining in contact with the electrically heated spirals. The objections to the above processes have been overcome by my process now to be disclosed. That is to say, I have discovered a principle by which high efficiencies of oxidation are attained on a commercial scale, adapted to produce hundreds of pounds of nitric acid daily. In the first place, I use a new form of catalyzer, coupled with the use of electrical energy for supplying the necessary heat to maintain the necessary reacting temperature in the apparatus.

The previous forms of catalyzers used so far as I am aware have consisted of platinum tubes, various complex combinations of sheets and tubes, interlacing of platinum sheet, platinized mica, and even platinized asbestos as well as platinum sponge. None of these, however, lend themselves readily to electrical heating because their construction does not afford a uniform resistance throughout the catalyzer, and therefore, there will be some local overheating should an electrical current be passed through them. It is very important in this process that the catalyzer be absolutely uniformly heated, as exact temperature control is an important part of the oxidation process. I therefore, use for my catalyzer a gauze or fabric woven from uniformly drawn platinum wire, and supported on a suitable frame, all as will be clear from the accompanying drawings forming a part of this specification in which:—

Figure 2:
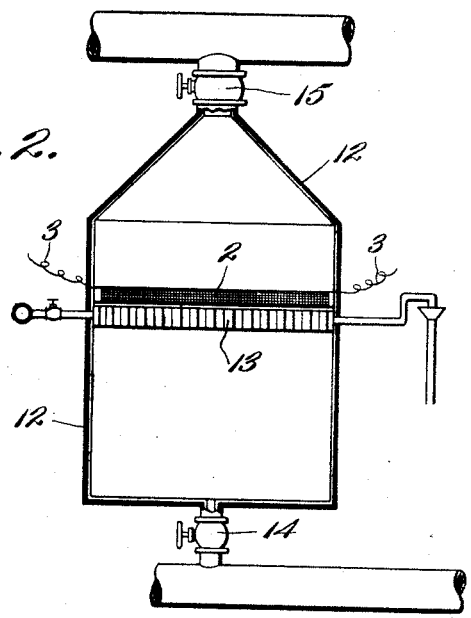

Figure 1 is a diagrammatic plan view of a catalyzer apparatus made in accordance with my invention; and Fig. 2 illustrates an oxidation chamber containing a cooler associated with such a catalyzing device.

In the said drawings 1 represents any suitable frame preferably of insulating material upon which is mounted the platinum mesh or wire cloth 2. The said cloth or mesh 2 is joined in the circuit 3 with a suitable generator or other source of current 4 and with the rheostat or other current controlling means 5.

By employing one or more catalyzers such as illustrated in the oxidation chamber 12, provided with a cooler 13, inlet 14, and outlet 15 in the manner disclosed in my said application, Serial No. 9595 above, I can heat the catalyzer material uniformly with an electric current, and by means of a suitable rheostat can maintain the temperature at any point desired.

I have found that the platinum gauze with wires of say .005 of an inch in diameter or less, and with meshes of say 60 to the inch serves very well, and that the diameter of the wire and number of meshes have little influence provided they are of dimensions less than those above stated. By inserting such a catalyzer in my apparatus I can heat it electrically to the desired temperature, and pass a current of an ammonia-air mixture through it attaining practically 100% efficiency in oxidation.

By means of the electrical control, consisting of either a resistance or a variable voltage transformer I can vary the heat generated in this form of catalyzer to correspond to the varying proportions of ammonia to air in the mixture, whether using air alone, or oxygen enriched air. Or in case I have sufficient oxygen in my enriched air, I can simply use this electrical energy for starting the reaction, after which it will take care of itself.

In case the ammonia-air mixture is not enriched by oxygen, it is found desirable to uniformly heat the catalyzer material above 500° C. and usually up to about 700° C. or higher, depending on the proportions of air and ammonia actually employed. It is also desirable to cool the mixture as much as possible before subjecting it to the action of the catalyzer, and to this end I may cool the mixture to any desired degree by passing it through suitable refrigerating coils before leading it to the oxidizing chamber, thereby facilitating the further cooling action of the apparatus 13 in said chamber. The best form of catalyzer I have found for this purpose, is one made of iridium free platinum. In other words, I find if even a very small quantity of iridium is present in the platinum, it greatly decreases the efficiency of the catalyzer.

It is evident that those skilled in the art may vary the details of my apparatus without departing from the spirit of the invention, and therefore I do not wish to be limited to the above disclosure except as may be required by the claims.

What I claim is:—

1. The herein described new catalyzer element comprising a wire gauze of iridium free platinum.

2. The herein described new catalyzer element comprising a wire gauze woven from a uniformly drawn wire of iridium free platinum.

3. The herein described new catalyzer element comprising a wire gauze fabric composed of uniformly drawn wire of iridium free platinum joined in an electric circuit, combined with means for controlling the energy passing through said circuit, substantially as described.

In testimony whereof I affix my signature, in presence of two witnesses.

WALTER S. LANDIS.

Witnesses:
G. M. SCHURMAN,
S. W. MAYS.